(12) United States Patent
Draving

(10) Patent No.: US 6,898,535 B2
(45) Date of Patent: May 24, 2005

(54) METHOD AND APPARATUS FOR DECOMPOSING SIGNAL JITTER USING MULTIPLE ACQUISITIONS

(75) Inventor: Steven D. Draving, Colorado Springs, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 45 days.

(21) Appl. No.: 10/685,027

(22) Filed: Oct. 14, 2003

(65) Prior Publication Data

US 2005/0080574 A1 Apr. 14, 2005

(51) Int. Cl.$^7$ .......................... G01R 13/00; G01R 23/16
(52) U.S. Cl. ........................... 702/69; 702/77; 324/620; 375/226
(58) Field of Search ........................ 702/57, 66, 69–73, 702/75–77, 79, 89, 189–191; 324/613, 620, 621; 11/76.19, 76.21, 76.22; 370/516; 375/224, 226

(56) References Cited

U.S. PATENT DOCUMENTS

| 6,137,283 A | 10/2000 | Williams et al. |
| 2002/0120420 A1 * | 8/2002 | Wilstrup et al. ............ 702/108 |
| 2003/0004664 A1 | 1/2003 | Ward et al. |
| 2004/0136450 A1 * | 7/2004 | Guenther .................... 375/226 |

* cited by examiner

*Primary Examiner*—Marc S. Hoff
*Assistant Examiner*—Manuel L Barbee (57) ABSTRACT

A method and apparatus for analyzing jitter in a signal. The signal is buffered to form a sequence of signal vectors and a time interval error function is calculated for each the signal vector. A time interval error spectrum is then calculated by transforming the time interval error function using a discrete Fourier transform. An average time interval error spectrum and an average power spectral density function are then calculated as averages of the amplitude of the time interval error spectrum and its amplitude squared, respectively. Parameters of the signal jitter are estimated from the average time interval error spectrum and the average power spectral density function.

42 Claims, 5 Drawing Sheets

METHOD AND APPARATUS FOR DECOMPOSING SIGNAL JITTER USING MULTIPLE ACQUISITIONS

FIELD OF THE INVENTION

This invention relates generally to the field of signal analysis. More particularly, this invention relates to the analysis of jitter in clocked signals.

BACKGROUND

Serial and other digital signals are often communicated as an analog signal consisting of a series of pulses representing binary symbols. Typically, the analog signal is sampled at discrete time intervals to extract the binary data. In an ideal system, the sampling is synchronized to be near the center of a pulse, but in practice the analog signal is subject to jitter. Jitter is the deviation of the significant instances of signal from its ideal position in time. If the jitter is sufficiently bad, the analog signal is sampled at the wrong side of a transition and a bit error may result.

Jitter may have a number of causes including random noise (thermal noise, shot noise and flicker noise in electronic components), system mechanisms (cross-talk from radiated or conducted signals, dispersion effects and impedance mismatches) and data-dependent mechanisms (inter-symbol interference, duty-cycle distortion). Jitter is usually categorized as being deterministic (or bounded) or random (unbounded). Deterministic jitter results from system and data-dependent mechanisms, while random jitter results from random noise.

Often a system designer or user is interested in the bit-error-ratio (BER) of a system. One method of estimating the BER requires knowing the magnitude of the random jitter and the magnitude of the deterministic jitter separately. Accordingly, methods have been developed to measure jitter in a signal and to decompose it into random and deterministic components.

Prior methods fit parametric models to measured time domain data (for example, tail-fitting to histograms) or use spectral methods (Fourier Analysis) applied to a single section of the signal.

SUMMARY

The present invention relates generally to a method and apparatus for analyzing jitter in clocked signals. Objects and features of the invention will become apparent to those of ordinary skill in the art upon consideration of the following detailed description of the invention.

In accordance with certain embodiments of the invention, the Fourier transforms of a number of time interval error (TIE) functions of a signal are processed together to estimate parameters of the jitter in the signal.

BRIEF DESCRIPTION OF THE DRAWINGS

The novel features believed characteristic of the invention are set forth in the appended claims. The invention itself, however, as well as the preferred mode of use, and further objects and advantages thereof, will best be understood by reference to the following detailed description of an illustrative embodiment when read in conjunction with the accompanying drawing(s), wherein:

DETAILED DESCRIPTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several Views of the drawings.

Examples of clocked signals are timing (or clock) signals, which are periodic signals such as a sequence of pulses, and data signals, are typically sequences of pulses and gaps representing binary or logical values 1 and 0. Clocked signals are subject to jitter. Jitter may have a number of causes including random noise (thermal noise, shot noise and flicker noise in electronic components), system mechanisms (cross-talk from radiated or conducted signals, dispersion effects and impedance mismatches) and data-dependent mechanisms (inter-symbol interference, duty-cycle distortion). Jitter is usually categorized as being deterministic (or bounded) or random (unbounded). Deterministic jitter results from system and data-dependent mechanism, while random jitter results from random noise. In order to quantify the amount of jitter in a signal, the signal is first acquired and stored in a memory. The signal may then be processed by an analyzer, which is typically implemented as a computer program running on a processor. For example, the processor may be embedded in a digital oscilloscope, a signal analyzer or a general-purpose computer. The results of the analysis are reported or otherwise made available to the user. The results may be reported by displaying them on an alphanumeric or graphical display, by storing them in a computer readable medium for later access by the user or by transmitting them to another digital device for further processing if so desired.

Figure 1:
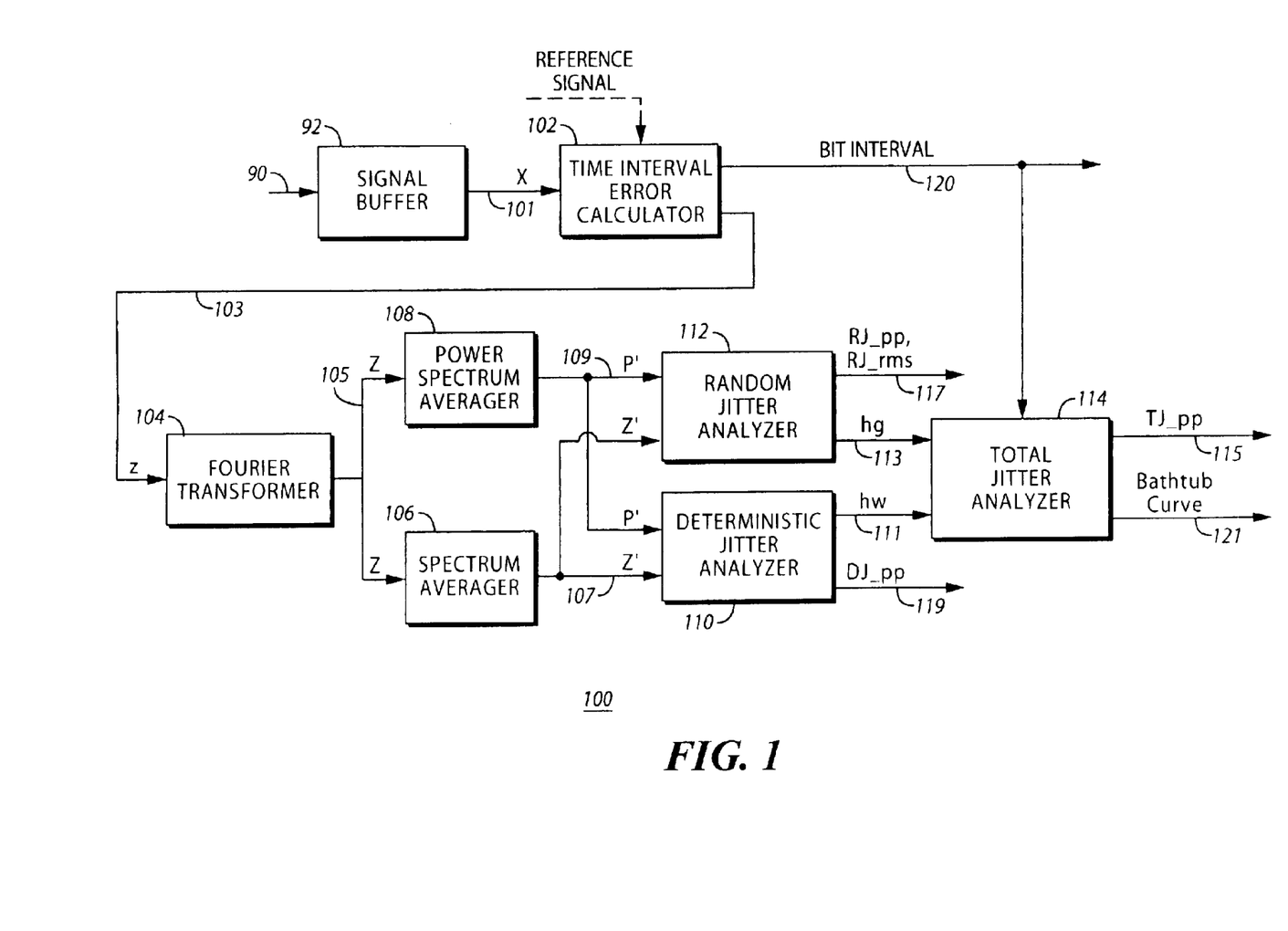
FIG. 1 is a diagrammatic representation of a system for analyzing timing signals in accordance with certain embodiments of the invention.

The jitter analyzer of the present invention may be used to analyze jitter in timing signals (clock signals) and in data signals. An exemplary embodiment of a system 100 for analyzing jitter in timing signals is shown in FIG. 1. Referring to FIG. 1, the system includes a signal buffer 92 that receives and buffers an input signal 90 to form a signal vector to be analyzed. The buffered signal vector x (101) is passed to a time interval error (TIE) calculator 102. The time interval error calculator determines the deviation of significant portions the signal (such as transitions) from their ideal positions in time. The ideal positions themselves may be determined from the signal itself or from a reference signal. The sequence of time deviations is termed the time interval error (TIE) 103 and is denoted by z. Typically, the boundaries of a time interval are found by detecting signal transitions. The TIE is the deviation of these transitions from their ideal positions in time. The symbol value is determined from the level of the signal at one or more positions within the interval.

The TIE (103) is then passed to a Fourier transformer 104 that calculates the discrete Fourier transform Z (105) of the TIE. The Fourier transformer may use a fast Fourier transform (FFT) algorithm. The Fourier transformer 104 produces the spectrum Z of the TIE. Spectrum averager 106 calculates an average Z' (107) of the magnitude, |Z|, of the TIE spectrum over a number of measures. The average may be a weighted-average over a specified number of measurements or it may be a running average, using an exponential weighting for example. The spectrum Z (105) of the TIE is also passed to a power spectrum averager 108. The power spectrum averager calculates an average P' (109) of the amplitude squared TIE spectrum, $|Z|^2$. The average may be a weighted average over a specified number of measurements or it may be a running average, using an exponential weighting for example.

The average power spectrum P' and the averaged TIE spectrum Z' are passed to deterministic jitter analyzer 110 and also to random jitter analyzer 112. The deterministic jitter analyzer 110 computes a histogram hw (111) of the deterministic jitter and reports the peak-to-peak value as DJ_pp (119). Details of the operation of the deterministic jitter analyzer 110 are discussed below with reference to FIG. 2. The random jitter analyzer 112 computes a distribution hg (113) of the random jitter and reports the peak-to-peak and RMS values as RJ_pp and RJ_rms, respectively (117). Details of the operation of the random jitter analyzer 112 are discussed below with reference to FIG. 2.

The histogram hw (111) of the deterministic jitter and the distribution hg (113) of the random jitter are passed to total jitter analyzer 114. The total jitter analyzer 114 convolves hw and hg to form a total jitter histogram ht. The peak-to-peak value of the total jitter histogram ht is calculated for a given bit error rate and reported as TJ_pp (115). The total jitter analyzer 114 may also calculate a "bathtub" curve 121 from the total jitter histogram ht and the bit interval value 120. The bathtub curve is a combination of the complementary cumulative distribution function of one transition (the probability that the first transition will occur after a specified time) with the cumulative distribution function of the following transition (the probability that the second transition will occur before a specified time). This data information may then be used as desired. The information may be displayed, listed, passed along for further processing if so desired, stored off for future use, or otherwise reported to the user.

Figure 2:
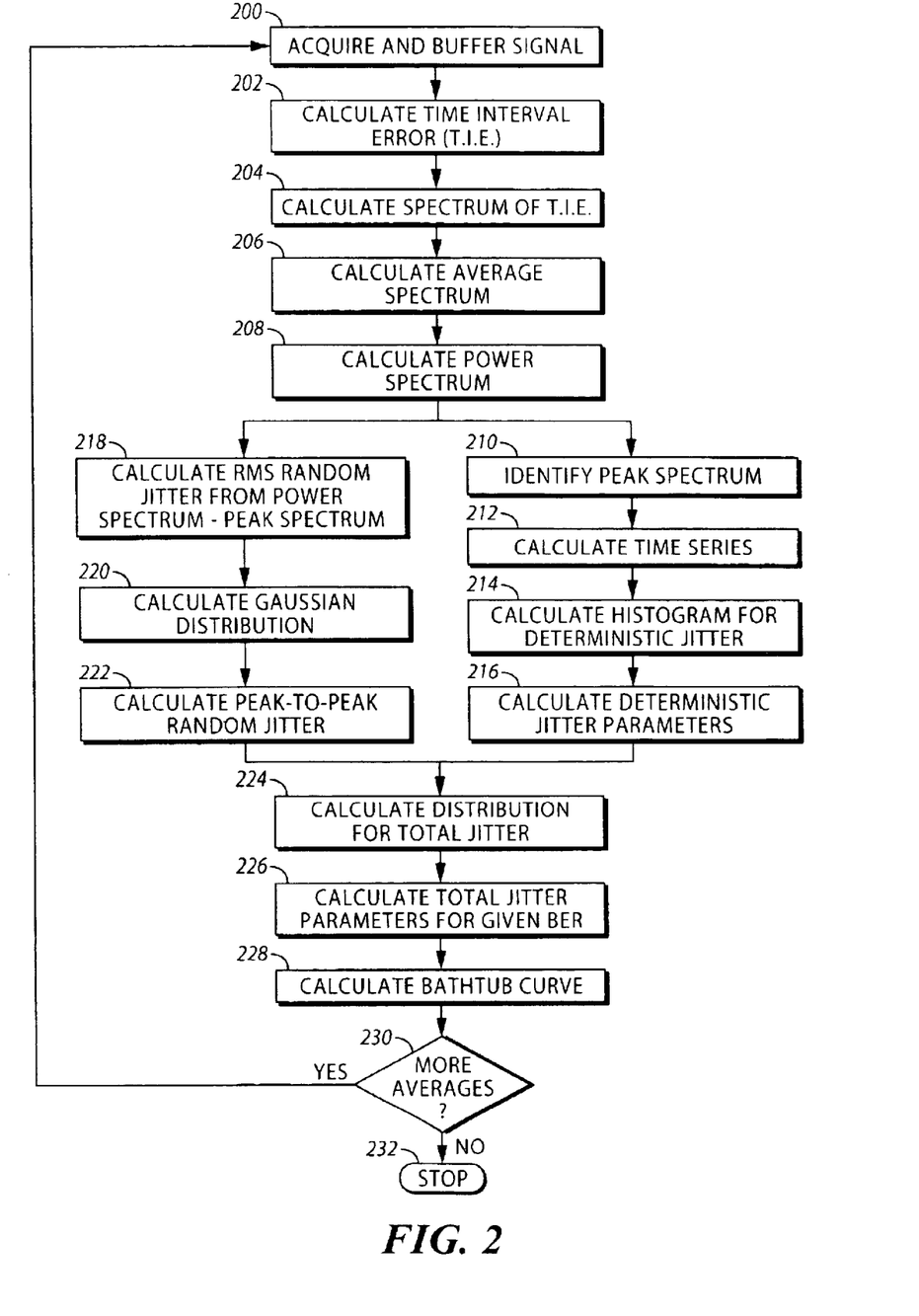
FIG. 2 is a flow chart depicting a method for analyzing timing signals in accordance with certain embodiments of the invention.

A flow chart depicting an embodiment of certain aspects of the invention is shown in FIG. 2. The flow chart depicts how the parameters associated with the deterministic, random and total jitter of a signal are determined. Referring to FIG. 2, the signal to be analyzed is acquired and buffered at block 200 to form a signal vector and the time interval error (TIE) of the buffered signal x is calculated at block 202. The spectrum Z of the TIE is calculated at block 204. At block 206, an average Z' of the magnitude of the TIE spectrum Z is calculated. The average may be a weighted-average over a specified number of measurements or it may be a running average, using an exponential weighting for example. At block 208, an average of the amplitude squared of the TIE spectrum is calculated to provide an averaged power spectrum P' of the TIE.

Blocks 210, 212, 214 and 216 describe the operation of the deterministic jitter analyzer. The average power spectrum P' typically comprises number of spectral peaks superimposed upon a relatively smooth spectral noise floor. At block 210 the peaks of the average power spectrum P' that are above the noise floor are identified. The frequencies of these peaks are denoted by Fp. The remaining frequencies of the spectrum are denoted by Fn. Alternatively, the frequencies Fp can be identified from the averaged TIE spectrum, Z'. At block 212, an estimate of the time series of the deterministic component of the TIE is made. First a modified spectrum is calculated using the amplitude of Z' and the phase of Z. Then an inverse transform w of the modified spectrum is calculated. The inverse transform may be performed as inverse discrete transform, using only the non-zero frequency bins (Fp) or by performing an inverse FFT of the spectrum after setting the values of the modified spectrum to zero at the frequencies Fn. A running histogram hw of the inverse transform w is then calculated at block 214. At block 216, one or more parameters of the deterministic jitter are calculated. An example parameter is the peak-to-peak value of the histogram hw, which is denoted DJ_pp.

Blocks 218, 220 and 222 describe the operation of the random jitter analyzer. At block 218 the square of the average TIE spectrum is subtracted from the average power spectrum at the peak frequencies, Fp. This produces a modified power spectrum $P'-|Z'|^2$ that is an estimate of the power spectrum of the random jitter. From this spectrum a number of random jitter parameters may be found. For example, in one embodiment of the invention the square root of the integral of the modified power spectrum is calculated. This parameter corresponds to the standard deviation of the random jitter and is denoted by RJ_rms. Random jitter is generally accepted to be well-modeled by a Gaussian probability distribution. A Gaussian distribution is completely determined by its standard deviation and mean values. At block 222, a Gaussian distribution function hg with standard deviation RJ_rms is calculated. From the Gaussian distribution function hg, a peak-to-peak value RJ_pp is calculated for a given error rate. The distribution function describes the probability that an individual time-error will be less-than or equal-to a particular value. The peak-to-peak value is determined from the time-error that gives a probability of occurrence equal to 1 minus the bit-error rate. For example, $10^{-12}$ is a common bit-error rate.

As an alternative to using the Gaussian distribution, the random portion of the TIE spectrum, Z, can be transformed back into the time-domain using an inverse discrete Fourier transform (IDFT). The random portion of the TIE spectrum, Z, may be obtained by using the values of Z at the frequencies Fn and the values $(P'-|Z'|^2)^{1/2}$ with a randomly distributed phase at the frequencies Fp. The resulting time-domain function, r, is then used to calculate a running histogram hr. The Gaussian distribution function hg may be obtained by parametric fitting to the histogram hr.

The histogram of the deterministic jitter may be used as an estimate of the probability distribution function of the deterministic jitter. Since the deterministic jitter and the random jitter are independent, the distribution function ht of the total jitter is estimated at block 224 as the convolution of hw and hg. The peak-to-peak value of the total jitter is calculated at block 226 for a given error rate. This value is denoted as TJ_pp. At block 228, a bathtub curve for the total jitter is calculated from ht and the bit interval value.

At decision block 230, a check is made to determine if more averages are to be performed. If so, as indicated by the positive branch from decision block 230, flow returns to block 200 and a new signal vector is processed. If the averaging process is complete, as depicted by the negative branch from decision block 230, the process terminates block 232. In this manner, the process may operate in a continuous fashion, performing running averages of the TIE spectrum and the TIE power spectrum. The averaging process provides greater accuracy as compared to a method that uses a single signal acquisition.

Figure 3:
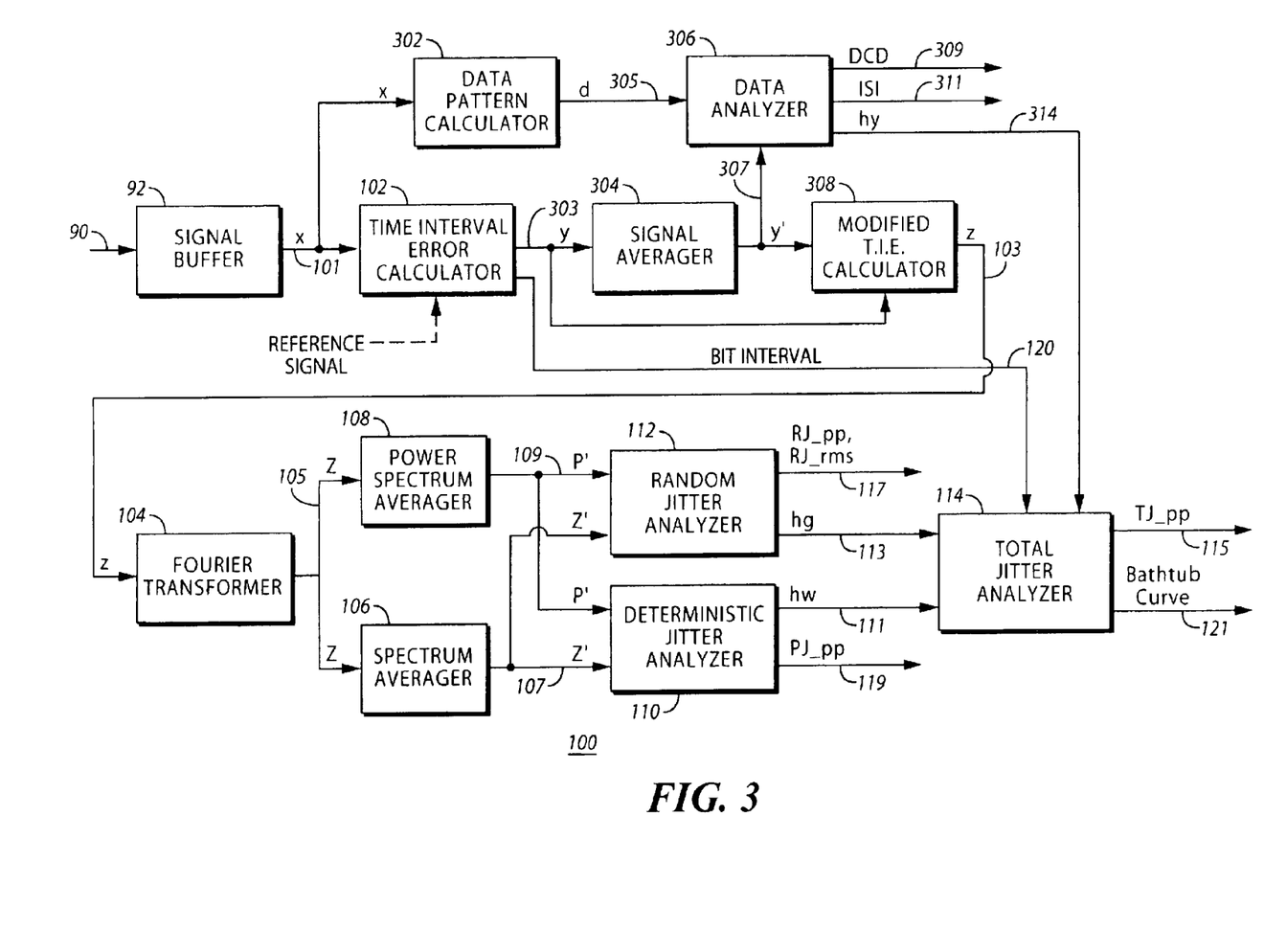
FIG. 3 is a diagrammatic representation of a system for analyzing data signals in accordance with certain embodiments of the invention.

An exemplary embodiment of a system 100 for analyzing jitter in data signals is shown in FIG. 3. Referring to FIG. 3, the system includes a signal buffer 92 that receives and buffers the signal 90 to be analyzed. The time interval error (TIE) calculator 102 has the buffered signals x (101) and d (305) as input. The time interval error calculator determines the deviation of significant portions the signal (such as transitions) from their ideal positions in time. The ideal positions themselves may be determined from the signal itself or from a reference signal. The sequence of time deviations is termed the data time interval error (TIE) 303 and is denoted by y. A symbol (0 or 1) may be repeated one or more times in a data sequence. In non-return to zero (NRZ) encoding schemes signal transitions do not occur between repeated symbols, hence the data TIE signal y (303) has no defined value in these time intervals.

The buffered signal, x, is also passed to a data pattern calculator 302 that computes the data pattern d (305) of the input signal. The data pattern of the first signal vector is used as a reference to skew subsequent signal vectors so that the data patterns and data TIE functions are time-aligned with the first data vector.

The data TIE signals 303 from a number of signal vectors are averaged in signal averager 304 to produce an averaged data TIE y' (307). This may be a running average with linear, exponential of other weighting. The averaged data TIE and the data function d are used in data analyzer 306 to calculate the duty cycle distortion (DCD) and intersymbol interference (ISI) values. These values are reported as DCD (309) and ISI (311). In addition, the data analyzer may calculate a histogram hy (314) of the averaged TIE y'. The operation of the data analyzer will be discussed below in reference to FIG. 4.

The averaged data TIE y' (307) is also passed to calculator 308, which calculates the TIE function z (103) by subtracting the averaged data TIE function y' from the current data TIE function y and filling the holes (created by repeated data symbols) by interpolation. The rest of the data signal jitter analysis then proceeds as for the timing signal jitter described above, except that values of w obtained using interpolation are not used in the calculation of the histogram hw.

Figure 4:
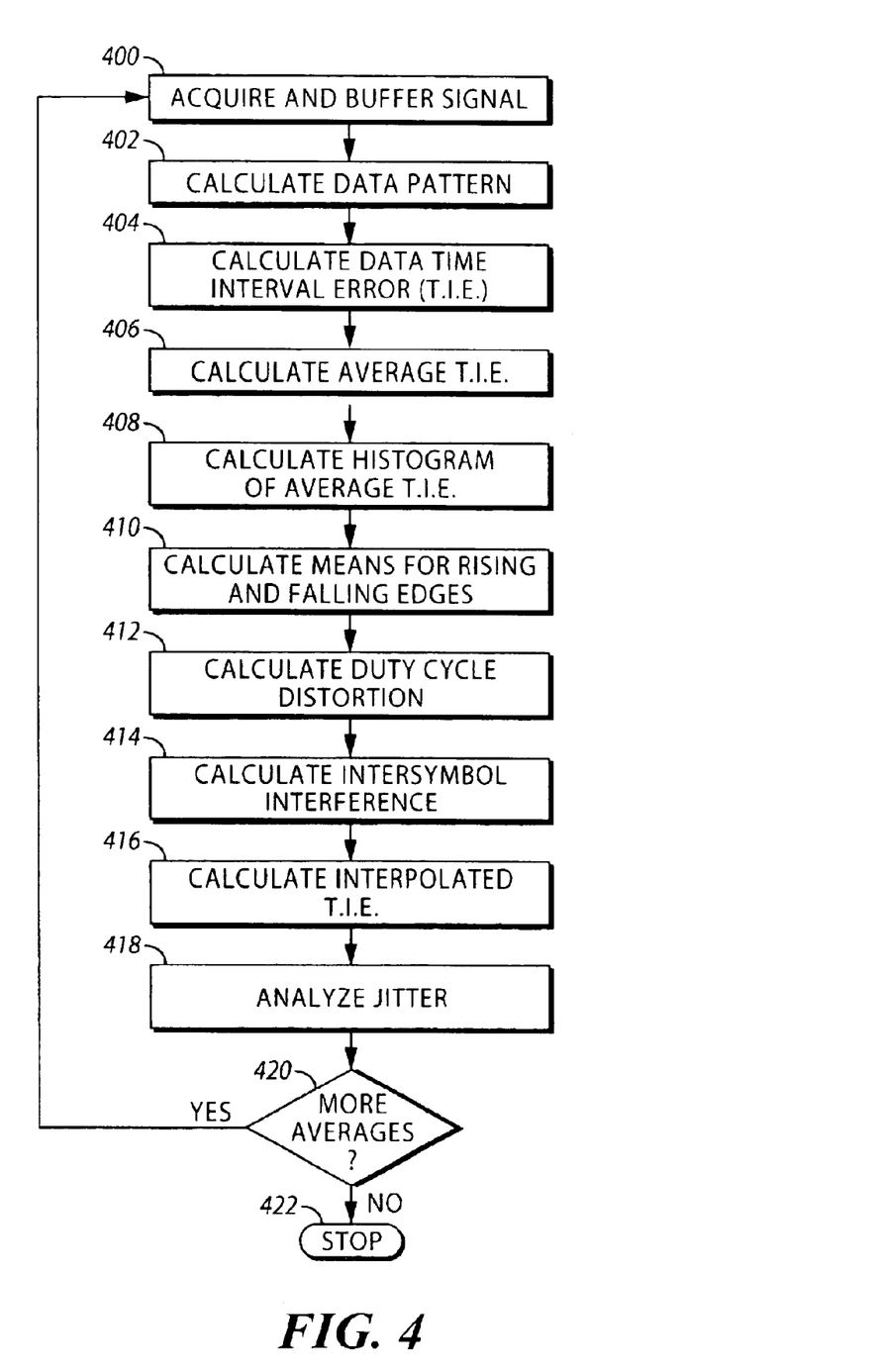
FIG. 4 is a flow chart depicting a method for analyzing data signals in accordance with certain embodiments of the invention.

A flow chart depicting certain aspects of the method for analyzing jitter in data signals is shown in FIG. 4. Referring to FIG. 4, the signal to be analyzed is acquired and buffered at block 400. The data pattern function, d, of the acquired data signal is calculated at block 402. At block 404, the data time interval error function, y, is calculated. Since a symbol (0 or 1) may be repeated one or more times in a data sequence, signal transitions do not occur in each clock interval, hence the data TIE function y has no defined value in these intervals. On the first acquisition of a data signal, the data pattern d is noted. On subsequent acquisitions, the data signal is skewed so that the data function is time-aligned with the initial acquisition. The TIE function may be derived from the skewed data, or it may be derived from the original data and skewed to time-aligned with the initial acquisition. At block 406, an average y' of the TIE is calculated. This may be a running average with an exponential, linear or other weighting. The data signal is then analyzed to determine parameters such as the duty cycle distortion (DCD) and the intersymbol interference (ISI). First, a histogram hy of the averaged TIE y' is calculated at block 408. Next, the running means of the y' values associated with rising and falling edges of the signals are both calculated at block 410. The magnitude of the difference between these two means is calculated at block 412 and reported as the duty cycle distortion (DCD). The running peak-to-peak values associated with the rising and falling edges are calculated at block 414 and the mean of these peak-to-peak values is reported as the intersymbol interference (ISI). At block 416, a interpolated TIE function, z, is calculated by subtracting the average TIE function, y', from the current TIE function, y. The average TIE function, y' provides an estimate of the data-dependent TIE, so after the subtraction, only the data-independent TIE remains. The undefined values associated with repeated data symbols are then filled in by interpolating from neighboring values.

The analysis of the random, deterministic and total jitter of the data signal is performed block 418. This analysis is similar to the analysis of a clock signal described above in reference to FIG. 1 and FIG. 2, and is described in more detail below with reference to FIG. 5.

At decision block 420, a check is made to determine if more averages are to be performed. If so, as indicated by the positive branch from decision block 420, flow returns to block 400 and a new signal vector is processed. If the averaging process is complete, as depicted by the negative branch from decision block 420, the process terminates block 422. In this manner, the process may operate in a continuous fashion, performing running averages of the TIE spectrum and the TIE power spectrum. The averaging process provides greater accuracy as compared to a method that uses a single signal vector.

The spectral averaging and associated jitter analysis may be performed continuously in real time or performed off-line on data previously collected.

Figure 5:
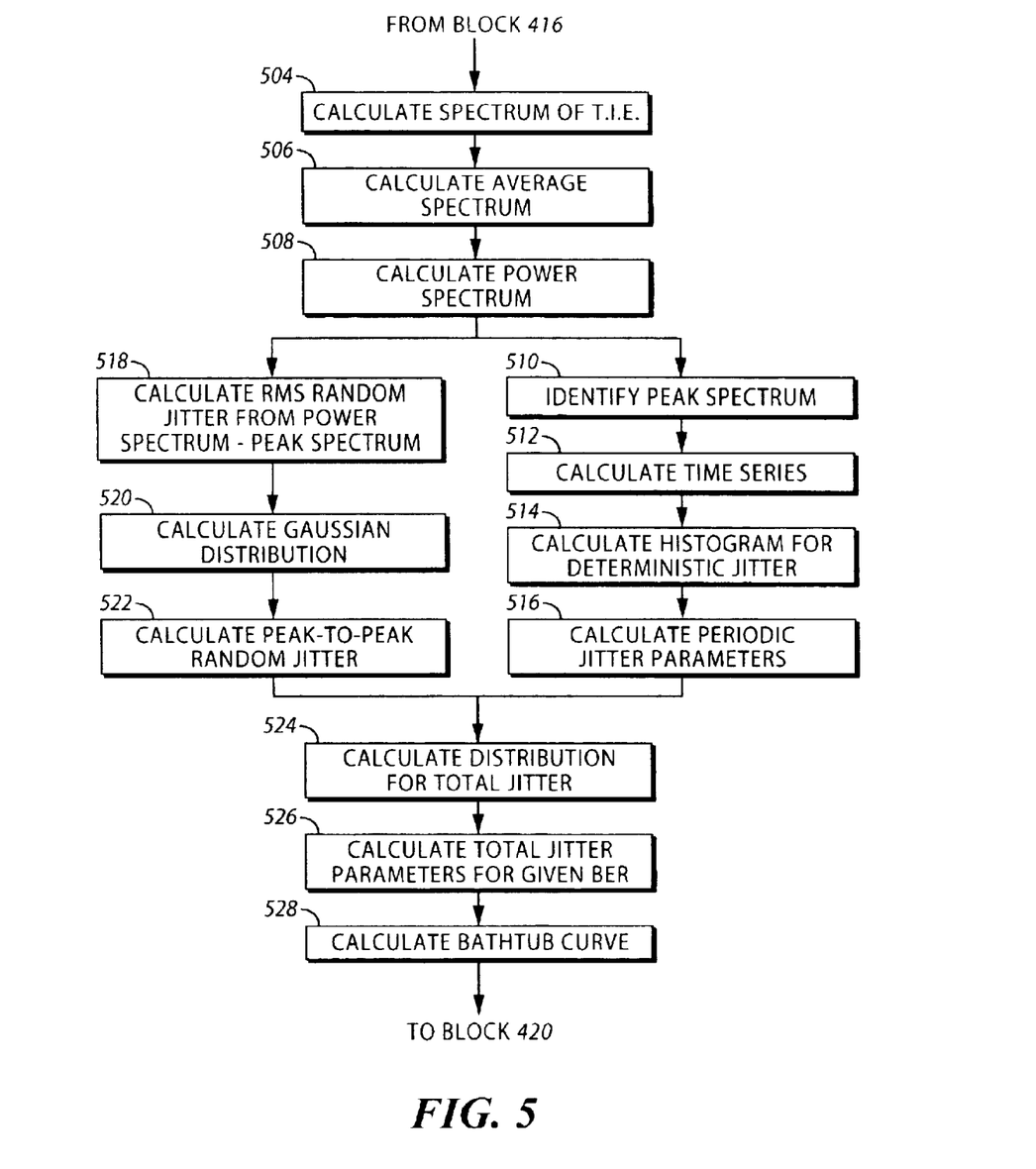
FIG. 5 is a flow chart depicting a portion of a method for analyzing data signals in accordance with certain embodiments of the invention.

FIG. 5 is a flow chart depicting one embodiment of the jitter analysis performed in block 418 of FIG. 4. Referring to FIG. 5, the spectrum Z of the interpolated TIE is calculated at block 504. At block 506, an average Z' of the magnitude of the TIE spectrum Z is calculated. At block 508, an average of the amplitude squared of the TIE spectrum is calculated to provide an averaged power spectrum P' of the TIE.

Blocks 510, 512, 514 and 516 describe the operation of the periodic jitter analyzer. The average power spectrum P' typically comprises number of spectral peaks superimposed upon a relatively smooth spectral noise floor. At block 510 the peaks of the average power spectrum P' that are above the noise floor are identified. The frequencies of these peaks are denoted by Fp. The remaining frequencies of the spectrum are denoted by Fn. Alternatively, the frequencies Fp can be identified from the averaged TIE spectrum, Z'. At block 512, an estimate of the time series of the deterministic component of the TIE is made. First a modified spectrum is calculated using the amplitude of Z' and the phase of Z. Then an inverse transform w of the modified spectrum is calculated. The inverse transform may be performed as inverse discrete transform, using only the non-zero frequency bins (Fp) or by performing an inverse FFT of the spectrum after setting the values of the modified spectrum to zero at the frequencies Fn. A running histogram hw of the inverse transform w is then calculated at block 514. The values of w associated with 'holes' in y are not used in the calculation of the histogram hw of the periodic (deterministic) part of the signal. That is, only the values associated with signal transitions are used. At block 516, one or more parameters of the deterministic jitter are calculated. An example parameter is the peak-to-peak value of the periodic jitter histogram hw, which is denoted PJ_pp.

Blocks 518, 520 and 522 describe the operation of the random jitter analyzer. At block 518 the square of the average TIE spectrum is subtracted from the average power spectrum at the peak frequencies, Fp. This produces a modified power spectrum $P'-|Z'|^2$ that is an estimate of the power spectrum of the random jitter. From this spectrum a number of random jitter parameters may be found. For example, in one embodiment of the invention the square root of the integral of the modified power spectrum is calculated. This parameter corresponds to the standard deviation of the random jitter and is denoted by RJ_rms. Random jitter is generally accepted to be well modeled by a Gaussian probability distribution. A Gaussian distribution is completely determined by its standard deviation and mean values. At block 520, a Gaussian distribution function hg with standard deviation RJ_rms is calculated. From the Gaussian distribution function hg, a peak-to-peak value RJ_pp is calculated for a given error rate at block 522. The distribution function describes the probability that an individual time-error will be less-than or equal-to a particular value. The peak-to-peak value is determined from the time-error that gives a probability of occurrence equal to 1 minus the bit-error rate. For example, $10^{-12}$ is a common bit-error rate.

As an alternative to using the Gaussian distribution, the random portion of the TIE spectrum, Z, can be transformed back into the time-domain using an inverse discrete Fourier transform (IDFT). The random portion of the TIE spectrum, Z, may be obtained by using the values of Z at the frequencies Fn and the values $(P'-|Z'|^2)^{1/2}$ with a randomly distributed phase at the frequencies Fp. The resulting time-domain function, r, is then used to calculate a running histogram hr. The values of r associated with 'holes' in y should not be used in the calculation of the histogram hr. The Gaussian distribution function hg may be obtained by parametric fitting to the histogram hr.

The histogram of the periodic (deterministic) jitter may be used as an estimate of the probability distribution function of the periodic jitter. The distribution function ht of the total jitter is estimated at block 524 as the convolution of hy, hw and hg. The peak-to-peak value of the total jitter is calculated at block 526 for a given error rate. This value is denoted as TJ_pp. At block 528, a bathtub curve for the total jitter is calculated from ht and the bit interval value.

Those of ordinary skill in the art will recognize that the present invention could be implemented using hardware components such as special purpose hardware and/or dedicated processors, which are equivalents to the invention as, described and claimed. Similarly, general purpose computers, microprocessor based computers, digital signal processors, microcontrollers, dedicated processors, custom circuits, ASICS and/or dedicated hard wired logic may be used to construct alternative equivalent embodiments of the present invention.

Those skilled in the art will also appreciate that the program steps and associated data used to implement the embodiments described above can be implemented using disc storage as well as other forms of storage, such as, for example, Read Only Memory (ROM) devices, Random Access Memory (RAM) devices, optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for analyzing jitter in a signal comprising:
   buffering the signal to form a sequence of signal vectors; and
   for each signal vector of the sequence of signal vectors:
      calculating a time interval error function of the signal vector;
      transforming the time interval error function using a discrete Fourier transform to produce a time interval error spectrum;
      calculating an average time interval error spectrum as an average of the magnitude of the time interval error spectrum;
      calculating an average power spectral density function as an average of the power time interval error spectrum;
      estimating parameters of the signal jitter from the average time interval error spectrum and the average power spectral density function; and
   reporting the parameters of the signal jitter.

2. A method in accordance with claim 1, wherein at least one of the average time interval error spectrum and the average power spectral density function is calculated as a running average.

3. A method in accordance with claim 1, wherein estimating parameters of the signal jitter comprises:
   identifying frequencies Fp corresponding to amplitude peaks in the time interval error spectrum;
   calculating a modified spectrum at the frequencies Fp having the amplitude of average time interval error spectrum and the phase of the time interval error spectrum;
   calculating a function w as an inverse discrete Fourier transform of the modified spectrum;
   calculating a running histogram hw of the function w; and
   calculating the peak-to-peak value of the histogram hw.

4. A method in accordance with claim 3, wherein identifying frequencies Fp comprises identifying the frequencies for which peaks in the average time interval error spectrum are above a noise floor.

5. A method in accordance with claim 3, wherein identifying frequencies Fp comprises identifying the frequencies for which peaks in the average power spectral density function are above a noise floor.

6. A method in accordance with claim 1, wherein estimating parameters of the signal jitter comprises:
identifying frequencies Fp corresponding to amplitude peaks in the time interval error spectrum;
subtracting the amplitude squared of the average time interval error spectrum from the average power spectral density function at the frequencies Fp to obtain a modified power spectral density function; and
calculating an RMS random jitter value RJ_rms as the square root of the integral of the modified power spectral density function.

7. A method in accordance with claim 6, wherein estimating parameters of the signal jitter further comprises:
calculating a Gaussian distribution function hg having a standard deviation of RJ_rms; and
calculating a peak-to-peak value RJ_pp of the Gaussian distribution function hg for a given error rate.

8. A method in accordance with claim 7, wherein estimating parameters of the signal jitter further comprises:
calculating a modified spectrum at the frequencies Fp having the amplitude of average time interval error spectrum and the phase of the time interval error spectrum;
calculating a function w as an inverse discrete Fourier transform of the modified spectrum;
calculating a running histogram hw of the function w;
convolving hw and hg to produce a total jitter function ht; and
calculating a peak-to-peak value TJ_pp of the total jitter function ht.

9. A method in accordance with claim 8, wherein estimating parameters of the signal jitter further comprises:
calculating a bathtub curve from ht and a bit interval value.

10. A method in accordance with claim 1, wherein calculating a time interval error function of the signal vector comprises:
buffering a reference timing signal to obtain a reference signal vector;
detecting reference transition times in the reference signal vector;
detecting signal transition times in the signal vector; and
calculating the time differences between reference transition times and signal transition times.

11. A method in accordance with claim 1, wherein calculating a time interval error function of the signal vector comprises:
detecting signal transition times in the signal vector;
estimating ideal transition times from the signal transition times; and
calculating the time differences between ideal transition times and signal transition times.

12. A method in accordance with claim 1, wherein calculating the average of the time interval error spectrum comprises calculating a weighted sum of the time interval error spectrum of the signal vector and time interval error spectra of a plurality of previous signal vectors.

13. A method in accordance with claim 12, wherein the weighted sum is an exponentially weighted sum and is calculated recursively.

14. A method in accordance with claim 1, wherein calculating the average of the power spectral density function comprises calculating a weighted sum of the power spectral density function of the signal vector and power spectral density functions of a plurality of previous signal vectors.

15. A method in accordance with claim 14, wherein the weighted sum is an exponentially weighted sum and is calculated recursively.

16. A method in accordance with claim 1, wherein the signal is a data signal, the method further comprising:
identifying an initial data pattern function of a first signal vector in the sequence of signal vectors;
for each signal vector following the first signal vector:
calculating a data pattern function, d;
skewing the data pattern function, d, to time-align it with the initial data pattern function;
calculating a time interval error function, y, time-aligned with the initial data pattern function;
calculating an average time interval error function y' as a running average of the skewed time interval error function y;
calculating a running histogram hy of the average time interval error function y';
calculating a first running mean as the running mean of those y' values associated with rising edges of the data pattern function, d;
calculating a second running mean as the running mean of those y' values associated with falling edges of the data pattern function, d; and
calculating a duty cycle distortion value as a magnitude difference between the first and second running means.

17. A method in accordance with claim 16, wherein estimating parameters of the signal jitter further comprises:
calculating a Gaussian distribution function hg having a standard deviation of RJ_rms; and
calculating a peak-to-peak value RJ_pp of the Gaussian distribution function hg for a given error rate.

18. A method in accordance with claim 17, wherein estimating parameters of the signal jitter further comprises:
calculating a modified spectrum at the frequencies Fp having the amplitude of average time interval error spectrum and the phase of the time interval error spectrum;
calculating a function w as an inverse discrete Fourier transform of the modified spectrum;
calculating a running histogram hw of the function w;
convolving, hw and hg to produce a total jitter function ht; and
calculating a peak-to-peak value TJ_pp of the total jitter function ht.

19. A method in accordance with claim 1, wherein the signal is a data signal, the method further comprising:
identifying an initial data pattern function of a first signal vector in the sequence of signal vectors;
for each signal vector following the first signal vector:
calculating a data pattern function, d;
skewing the data pattern function, d to time-align it with the initial data pattern function;
calculating a time interval error function, y, time-aligned with the initial data pattern function;
calculating an average time interval error function y' as a running average of the time interval error function y;
calculating a running histogram hy of the average time interval error function y';

calculating a first running peak-to-peak value of those y' values associated with rising edges of the data pattern function, d;

calculating a second running peak-to-peak value of those y' values associated with falling edges of the data pattern function, d; and calculating an intersymbol interference value as a mean of the first and second running peak-to-peak values.

20. A method in accordance with claim 1, wherein the signal is a data signal, the method further comprising:

identifying an initial data pattern function of a first signal vector in the sequence of signal vectors;

for each signal vector following the first signal vector:
calculating a data pattern function, d;
skewing the data pattern function, d to time-align it with the initial data pattern function;
calculating an first time interval error function, y, time-aligned with the initial data pattern function; and
calculating an average time interval error function y' as a running average of the first time interval error function y;

wherein calculating a time interval error function of the signal vector comprises:
subtracting y' from y to form a second average time interval error function; and calculating the time interval error function by interpolating the second modified average time interval error function to estimate the average time interval error function in intervals having no signal transition.

21. A system for analyzing jitter in a signal comprising:
a data buffer for storing a signal vector x;
a time interval error calculator for calculating a time interval error z of the signal vector x;
a Fourier transformer for calculating a time interval error spectrum Z as a discrete Fourier transform of the time interval error z;
a power spectrum averager for calculating an average power spectrum P' from an average of the amplitude squared of the time interval error spectrum Z;
a spectrum averager for calculating an average time interval error spectrum Z' from an average of the magnitude of the time interval error spectrum Z;
a deterministic jitter analyzer for estimating parameters of the deterministic jitter from the average time interval error spectrum and the average power spectrum; and
a random jitter analyzer for estimating parameters of the random jitter from the average time interval error spectrum and the average power spectrum.

22. A system in accordance with claim 21, wherein the deterministic jitter analyzer is operable to estimate a histogram hw of a deterministic component of the time interval error function and the random jitter analyzer is operable to estimate a histogram hg of a random component of the time interval error function, and further comprising:
a total jitter analyzer, responsive to the histograms hw and hg and operable to estimate parameters of the total jitter.

23. A system in accordance with claim 22, wherein the parameters of the total jitter include at least one of a bathtub curve and a bit interval value.

24. A system in accordance with claim 21, wherein the parameters of the deterministic jitter include the peak-to-peak value of the deterministic jitter.

25. A system in accordance with claim 21, wherein the parameters of the random jitter include the peak-to-peak value and the root mean square value of the random jitter.

26. A system for analyzing jitter in a data signal comprising:
a data buffer for storing a signal vector x;
a time interval error calculator for calculating a time interval error y of the signal vector x;
a data pattern calculator for calculating a data pattern function d of the signal vector x;
a signal averager for calculating a running average y', of the time interval error y; and
a data analyzer, responsive to the average time interval error y' and the data pattern function d and operable for estimate the duty cycle distortion and the intersymbol interference of the data signal;
wherein the time interval error y and the data pattern function d are time-aligned to an initial data pattern function.

27. A system in accordance with claim 26, wherein the data analyzer is further operable to calculate a histograms hy of the average time interval error function y'.

28. A system in accordance with claim 27, further comprising:
a modified time interval error calculator, responsive to the average time interval error y' and operable to estimate a modified time interval error function z;
a Fourier transformer for calculating a time interval error spectrum Z as a discrete Fourier transform of the modified time interval error z;
a power spectrum averager for calculating an average power spectrum P' from a running of the amplitude squared of the time interval error spectrum Z;
a spectrum averager for calculating an average time interval error spectrum Z' from a running average of the magnitude of the time interval error spectrum Z;
a deterministic jitter analyzer for estimating parameters of the deterministic jitter from the average time interval error spectrum and the average power spectrum; and
a random jitter analyzer for estimating parameters of the random jitter from the average time interval error spectrum and the average power spectrum.

29. A system in accordance with claim 28, wherein the deterministic jitter analyzer is operable to estimate a histogram hw of a deterministic component of the time interval error function and the random jitter analyzer is operable to estimate a histogram hg of a random component of the time interval error function, and further comprising:
a total jitter analyzer, responsive to the histograms hw and hg and operable to estimate parameters of the total jitter.

30. A system in accordance with claim 29, wherein the parameters of the total jitter include at least one of a bathtub curve and a peak-to-peak value of the total jitter.

31. A system in accordance with claim 29, wherein the parameters of the deterministic jitter include the peak-to-peak value of the deterministic jitter.

32. A system in accordance with claim 28, wherein the parameters of the random jitter include the peak-to-peak value and the root mean square value of the random jitter.

33. A computer readable medium storing a sequence of program instructions for controlling a computer to perform an analysis of jitter a signal, the sequence of program instructions including:
a plurality of instructions for calculating a time interval error function of a signal vector;
a plurality of instructions for transforming the time interval error function using a discrete Fourier transform to produce a time interval error spectrum;
a plurality of instructions for calculating an average time interval error spectrum as a running average of the magnitude of the time interval error spectrum;

a plurality of instructions for calculating an average power spectral density function as a running average of the power time interval error spectrum;

a plurality of instructions for estimating parameters of the signal jitter from the average time interval error spectrum and the average power spectral density function; and a plurality of instructions for reporting the parameters of the signal jitter.

34. A computer readable medium in accordance with claim 33, wherein the plurality of instructions for estimating parameters of the signal jitter comprises:

a plurality of instructions for identifying frequencies Fp corresponding to amplitude peaks in the time interval error spectrum;

a plurality of instructions for calculating a modified spectrum at the frequencies Fp having the amplitude of average time interval error spectrum and the phase of the time interval error spectrum;

a plurality of instructions for calculating a function w as an inverse discrete Fourier transform of the modified spectrum;

a plurality of instructions for calculating a running histogram hw of the function w; and a plurality of instructions for calculating a deterministic jitter value DJ_pp as the peak-to-peak value of the histogram w.

35. A computer readable medium in accordance with claim 33, wherein the plurality of instructions for estimating parameters of the signal jitter comprises:

a plurality of instructions for identifying frequencies Fp corresponding to amplitude peaks in the time interval error spectrum;

a plurality of instructions for subtracting the amplitude squared of the average a plurality of instructions for time interval error spectrum from the average power spectral density function at the frequencies Fp to obtain a modified power spectral density function; and a plurality of instructions for calculating an RMS random jitter value RJ_rms as the square root of the integral of the modified power spectral density function.

36. A computer readable medium in accordance with claim 35, wherein the plurality of instructions for estimating parameters of the signal jitter further comprises:

a plurality of instructions for calculating a Gaussian distribution function hg having a standard deviation of RJ_rms; and a plurality of instructions for calculating a peak-to-peak value RJ_pp of the Gaussian distribution function hg.

37. A computer readable medium in accordance with claim 36, wherein the plurality of instructions for estimating parameters of the signal jitter further comprises:

a plurality of instructions for calculating a modified spectrum at the frequencies Fp having the amplitude of average time interval error spectrum and the phase of the time interval error spectrum;

a plurality of instructions for calculating a function w as an inverse-discrete Fourier transform of the modified spectrum;

a plurality of instructions for calculating a running histogram hw of the function w;

a plurality of instructions for convolving hw and hg to produce a total jitter function ht; and a plurality of instructions for calculating a peak-to-peak value TJ_pp of the total jitter function ht.

38. A computer readable medium in accordance with claim 37, wherein the plurality of instructions for estimating parameters of the signal jitter further comprises:

a plurality of instructions for calculating a bathtub curve from ht and a bit interval value.

39. A system for analyzing jitter in a signal comprising:

means for receiving a signal vector x;

means for calculating a time interval error spectrum Z as a discrete Fourier transform of the time interval error of the signal vector x;

means for averaging the amplitude squared of the time interval error spectrum Z to produce an an average power spectrum P';

means for averaging the magnitude of the time interval error spectrum Z to produce an average time interval error spectrum Z';

means for estimating deterministic jitter parameters from the average time interval error spectrum Z' and the average power spectrum P'; and means for estimating random jitter parameters from the average time interval error spectrum Z' and the average power spectrum P'.

40. A system for analyzing jitter in a data signal comprising:

means for receiving a sequence of signal vectors;

computation means operable to:

calculate a data pattern function d of each signal vector x of the sequence of signal vectors;

calculate a time interval error y of each signal vector x of the sequence of signal vectors; and calculate an average time interval error y', of the time interval error y for the sequence of signal vectors; and calculate estimates of the duty cycle distortion and the intersymbol interference of the data signal from the average time interval error y' and the data pattern function d; and means for outputting the estimates of the duty cycle distortion and the intersymbol interference of the data signal, wherein the time interval error y and the data pattern function d are time-aligned to an initial data pattern function.

41. A system in accordance with claim 40, wherein the computation means is further operable to calculate a histograms hy of the average time interval error function y'.

42. A system in accordance with claim 41, wherein the computation means is further operable to calculate a modified time interval error dependent upon the average time interval error y' and to calculate a modified time interval error function z, and further comprising:

means for calculating a time interval error spectrum Z as a discrete Fourier transform of the modified time interval error function z;

means for averaging the amplitude squared of the time interval error spectrum Z to produce an an average power spectrum P';

means for averaging the magnitude of the time interval error spectrum Z to produce an average time interval error spectrum Z';

means for estimating deterministic jitter parameters from the average time interval error spectrum Z' and the average power spectrum P'; and means for estimating random jitter parameters from the average time interval error spectrum Z' and the average power spectrum P'.

* * * * *

UNITED STATES PATENT AND TRADEMARK OFFICE
CERTIFICATE OF CORRECTION

PATENT NO. : 6,898,535 B2
DATED : May 24, 2005
INVENTOR(S) : Draving

It is certified that error appears in the above-identified patent and that said Letters Patent is hereby corrected as shown below:

Column 10,
Line 49, after "convolving" delete ",".

Signed and Sealed this

Seventh Day of February, 2006

JON W. DUDAS
*Director of the United States Patent and Trademark Office*